United States Patent [19]

Ito et al.

[11] Patent Number: 4,687,283

[45] Date of Patent: Aug. 18, 1987

[54] SCANNING OPTICAL SYSTEM

[75] Inventors: Michio Ito, Hachioji; Yukimasa Shinohara, Funabashi; Nobuhiro Imai, Kawasaki, all of Japan

[73] Assignee: Canon Kabushiki Kaisha, Tokyo, Japan

[21] Appl. No.: 525,714

[22] Filed: Aug. 23, 1983

[30] Foreign Application Priority Data

Aug. 30, 1982 [JP] Japan ................. 57-150512

[51] Int. Cl.⁴ ................. G02B 26/08; G01D 9/42
[52] U.S. Cl. ................. 350/6.8; 346/108
[58] Field of Search ......... 350/6.8, 6.7, 6.6, 314, 350/276 R, 311, 438, 439; 346/108

[56] References Cited

U.S. PATENT DOCUMENTS

| | | | |
|---|---|---|---|
| 1,900,966 | 3/1933 | Wolfe | 350/314 |
| 2,384,578 | 9/1945 | Turner | 350/314 |
| 3,558,208 | 1/1971 | Hudson | 350/314 |
| 3,785,720 | 1/1974 | Kyryluk | 350/314 |
| 3,910,684 | 10/1975 | Glatzel | 350/444 |
| 4,368,488 | 1/1983 | Sakamoto | 350/6.8 |
| 4,378,480 | 3/1983 | Langhans | 350/6.8 |
| 4,466,699 | 8/1984 | Droessler et al. | 350/166 |

FOREIGN PATENT DOCUMENTS 0023914  2/1982  Japan ................. 350/6.8

*Primary Examiner*—John K. Corbin
*Assistant Examiner*—Vincent J. Lemmo
*Attorney, Agent, or Firm*—Fitzpatrick, Cella, Harper & Scinto

[57] ABSTRACT

A scanning optical system in which a light beam is moved by a movable deflector to scan a surface to be scanned is provided with a filter disposed between the movable deflector and the surface to be scanned. The filter is concavely shaped toward the movable deflector.

9 Claims, 6 Drawing Figures

SCANNING OPTICAL SYSTEM

BACKGROUND OF THE INVENTION

1. Field of the Invention

This invention relates to a scanning optical system of the so-called flying spot type which scans a surface to be scanned by a beam spot or a scanning optical system of the so-called flying image type in which the light beam from each portion of a surface to be scanned is received by light-receiving means through a deflector to thereby scan the surface to be scanned.

2. Description of the Prior Art

The above-described scanning optical system is utilized in a recording apparatus for recording electrical signals to be recorded or a reading apparatus for reading the information of a surface to be scanned.

In the scanning optical system, filters are used for various purposes and these filters are usually disposed at such positions whereat the light beam in the scanning optical system is not laterally moved. However, for example, in a laser beam printer adopting a scanning optical system of the flying spot type, if a filter is disposed between a light source unit and movable deflecting means, the laser beam always passes through the same position of the filter and therefore, the filter is deteriorated, and this has sometimes led to the spoiled original function of the filter. Also, where an imaging lens 6 for scanning is present between the deflecting means and the surface to be scanned, there occurs a result that the intensity of the beam spot differs between the beam passing through the central portion of the lens 6 and the beam passing through the marginal portion of the lens 6 due to the cos fourth power rule of the lens. In such a case when it is necessary to scan the surface to be scanned by beam spots of the same intensity, it is desirable that a filter having a lower light transmission factor in the central portion thereof than in the opposite end portions be disposed in the optical path between the movable deflecting means and the surface to be scanned. Also, in a scanning optical system of the flying image type, where it is desired to detect the light beams from various portions of the surface to be scanned at equal quantities of light by light-receiving means, it sometimes becomes necessary to dispose the filter as described above between the surface to be scanned and the deflecting means.

The filter heretofore used has been of a straight planar shape and it has been found that the inconveniences as described below occur if such a filter is disposed between the movable deflecting means and the surface to be scanned.

Referring to FIG. 1 of the accompanying drawings, the light beam 1 from a laser light source or the like enters a polygonal mirror 2 being rotated in the direction of arrow, is reflected thereby and becomes a scanning light 3. The scanning light 3 passes throught a straight planar filter 4 and scans a surface 5 to be scanned.

The amount of absorption of light of the filter is proportional to the length of the optical path in the filter. In FIG. 1, the length of the optical path in the filter of the scanning light $3a$ entering the filter perpendicularly thereto is t if the thickness of the filter is t. The length l of the optical path in the filter of the scanning light $3b$ entering at an angle of incidence $\alpha$ is $$l = \frac{t}{\cos \theta} \text{ but } \frac{\sin \alpha}{\sin \theta} = n$$

$n$: refractive index of the filter and since $t < l$, the scanning light $3b$ on the surface 5 to be scanned is smaller in quantity of light than the scanning light $3a$. Accordingly, as the angle of incidence $\alpha$ becomes smaller, the quantity of transmitted light becomes smaller and thus, irregularity of quantity of light occurs in the scanning area. In the flying image scanning optical system, this appears as the irregularity of the quantity of light entering the light-receiving element.

Also, as shown in FIG. 2 of the accompanying drawings, the scanning light 3 having entered the filter 4 at the position a thereof passes via a route of a→b→c and part of this light is reflected by the inner surface b of the filter 4 and some of the light is reflected via b→d→e→f. Where the scanning light is monochromatic light such as a laser beam, interference of light is caused by the reflected light a→b→d→e→f and the transmitted light d→e→f. That is, when the difference in length of the optical path between these lights is even number times the half-wavelength of the monochromatic light which is the scanning lingt, these lights strengthen each other and, when said difference in length of the optical path is odd number times the half-wavelength of the monochromatic light, these lights weaken each other. Therefore, a fringe pattern representing the strength and weakness of the quantity of light is created in the scanning area. This irregularity of quantity of light becomes denser and more conspicuous as the scanning angle is greater.

SUMMARY OF THE INVENTION

It is an object of the present invention to provide a scanning optical system which can prevent occurrence of the above-noted inconveniences.

It is another object of the present invention to provide a scanning optical system which can prevent or make inconspicuous occurrence of interference fringes at the end portions of the scanning area.

It is still another object of the present invention to provide a scanning optical system which can substantially equalize the attenuation factor of quantity of light of the scanning light in the entire scanning area.

Other objects and features of the present invention will become apparent from the following detailed description taken in conjunction with the accompanying drawings.

DESCRIPTION OF THE PREFERRED EMBODIMENTS

Figure 3:
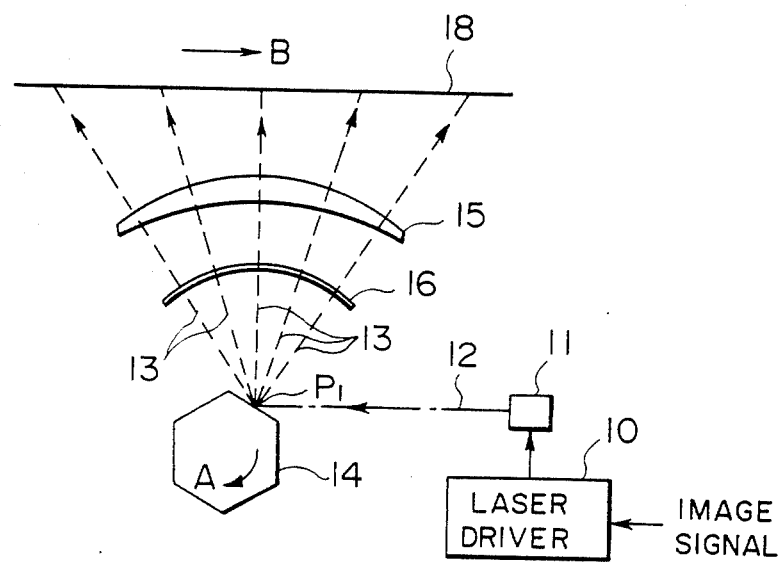
FIG. 3 illustrates an embodiment of the present invention.

Referring to FIG. 3, a semiconductor laser 11 as a light source is driven by a laser driver 10 controlled by an image signal as an electrical signal to be recorded and emits a laser beam 12 modulated correspondingly to the image signal. The laser beam 12 enters a polygonal mirror 14 at a portion $P_1$ thereof and is deflected by the polygonal mirror 14. Since the polygonal mirror 14 is rotated at a constant speed in the direction of arrow A, the laser beam 13 from the laser 11 deflected by the polygonal mirror 14 is rotatively moved. This scanning beam 13 passes through a light-decreasing filter 16 and enters an electrophotographic photosensitive surface 18 which is a surface to be scanned, and scans the photosensitive surface 18 in the direction of arrow B. Thus, an electrostatic latent image corresponding to the image signal is formed on the photosensitive surface 18.

The electrostatic latent image is developed and the resultant visible image is transferred to paper and fixed thereon. The various means for executing these processes are well known and need not be described.

The beam 13 passed through the filter is imaged as a spot on the photosensitive surface 18 by a lens 15. This lens 15 should preferably be an f-$\theta$ lens in order that the beam 13 may be moved at a uniform speed on the photosensitive surface 18. Where a galvano mirror is used as a movable deflector 14, the lens 15 should preferably be an f-arc sin $\theta$ lens in order that the beam 13 may be moved at a uniform speed on the photosensitive surface 18. However, this is not restrictive, but a conventional imaging lens may also be employed as the lens 15.

Now, in FIG. 3, the filter 16 is scanned by the beam 13 and has the same thickness over the full length of the scanning area thereof. The filter 16 is in the form of an arc whose center of curvature is the position $P_1$ at which the beam 12 is deflected by the polygonal mirror 14. Exactly speaking, this position $P_1$ is more or less displaced with the rotation of the polygonal mirror 14 and therefore, the filter 16 has an arcuate shape centered about an arbitrary position in the range near the position $P_1$. Accordingly, each scanning light 13 deflected by the polygonal mirror 14 enters the filter 16 substantially perpendicularly thereto over the full length of the scanning area of the filter 16 and therefore, no interference action occurs between adjacent light beams. Also, if the thickness of the filter 16 is made uniform with respect to the scanning direction of the beam 13, the lengths of the optical paths of the respective light beams passing through the filter 16 become substantially equal and therefore, irregularity of the quantity of light on the surface to be scanned with respect to the scanning direction can be prevented.

Figure 1:
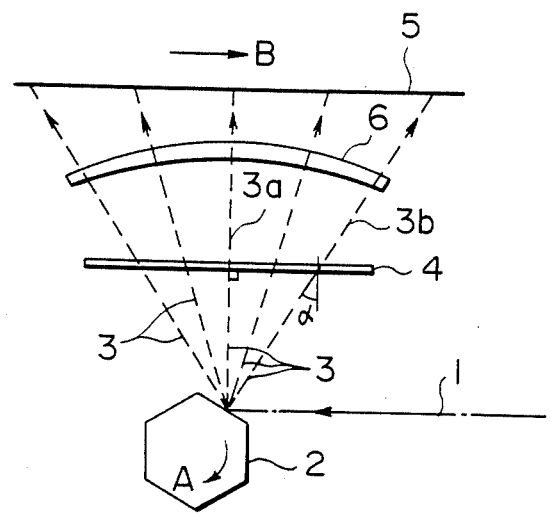
FIG. 1 illustrates a scanning optical system using a straight planar filter.
Figure 2:
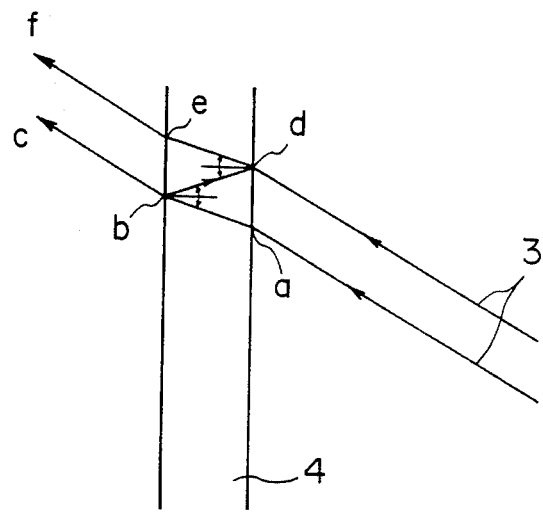
FIG. 2 illustrates the optical path in the straight planar filter.

According to our experiment, when a semiconductor laser was employed as the light source and the distance from the polygonal mirror to the surface to be scanned was 220 mm and a gelatin ND filter (having a transmission factor of about 70% and a thickness of about 80$\mu$) produced by Eastman Kodak, Inc. was employed as the filter, it was found in the construction of the scanning optical system shown in FIG. 1 that where $\alpha \div 20°$, the difference in quantity of light between scanning lights 3a and 3b was about 6%, the pitch of the irregularity of quantity of light caused by the interference of light on the surface 5 to be scanned in the vicinity of scanning light 3b was about 8 mm and the difference in quantity of light was about 8%.

In contrast, in the apparatus shown in FIG. 3, if the filter 16 is curved to such a degree as to minimize the angle of incidence of the laser beam 13 onto the filter within about 8° in the entire scanning area, the irregularity of quantity of light caused by the difference in length of the optical path in the filter is several percent or less and the pitch of the irregularity of quantity of light caused by interference of light is as great as 30 mm and thus is inconspicuous and practically offers no problem. Particularly, if the laser beam 13 entering the filter became substantially perpendicular, any difference in quantity of light, any irregularity of quantity of light, etc. were not observed.

Figure 4:
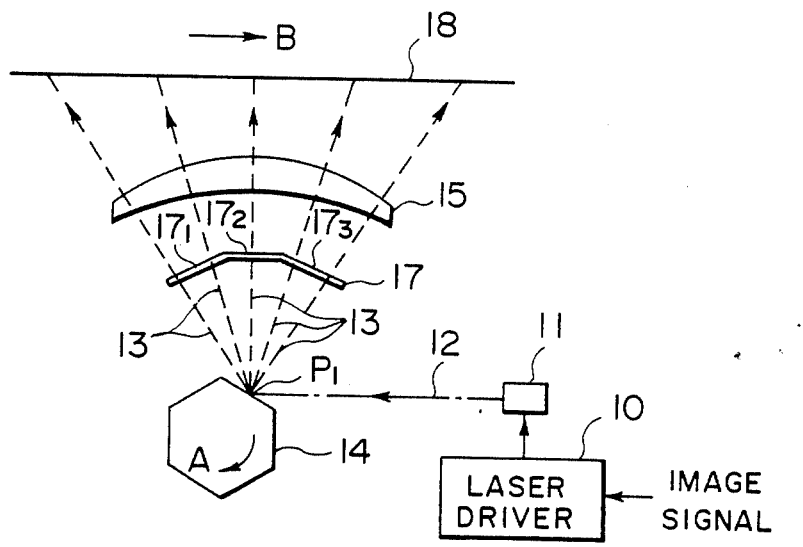
FIG. 4 illustrates another embodiment of the present invention.

In the embodiment shown in FIG. 3, the surface of the filter is formed into a curved shape so that the light beam entering the filter enters perpendicularly to the filter, whereas in the example shown in FIG. 4, a planar filter is bent a plurality of times so that the light beam entering the filter 17 enters as perpendicularly as possible to the filter in each portion of the scanning area. By the filter being thus bent a plurality of times and a plurality of planar portions $17_1$, $17_2$ and $17_3$ being disposed in a concave shape as a whole, the filter 17 is formed into a shape as approximate as possible to an arcuate shape, like the filter 16 shown in FIG. 3. The filter 17 may be formed either by bending a planar filter a plurality of times as previously described or by arranging a plurality of planar filters so as to from a concave shape as a whole. Thus, the concave surface of the filter 17 is directed toward the polygonal mirror 14. It is desirable that the planar portions $17_1$, $17_2$, and $17_3$ of the filter 17 be disposed so that the angle of incidence of the beam 13 onto the filter 17 is 8° or less over the entire scanning area.

In FIGS. 3 and 4, the filter is disposed in the optical path between the polygonal mirror and the lens. This is preferable in that the dimension of the filter can be made smaller. Alternatively, however, the filter may be disposed in the optical path between the lens and photosensitive surface.

As the filters 16 and 17, use can be made of ones having a substantially uniform transmission factor over the full length of the scanning area. However, where it is desired to correct any reduction in the quantity of marginal light attributable to the cos fourth power rule of the lens, filters having a higher density in the central portion thereof and having a lower transmission factor in the central portion thereof than in the opposite end portions may be employed as the filters 16 and 17.

Figure 5:
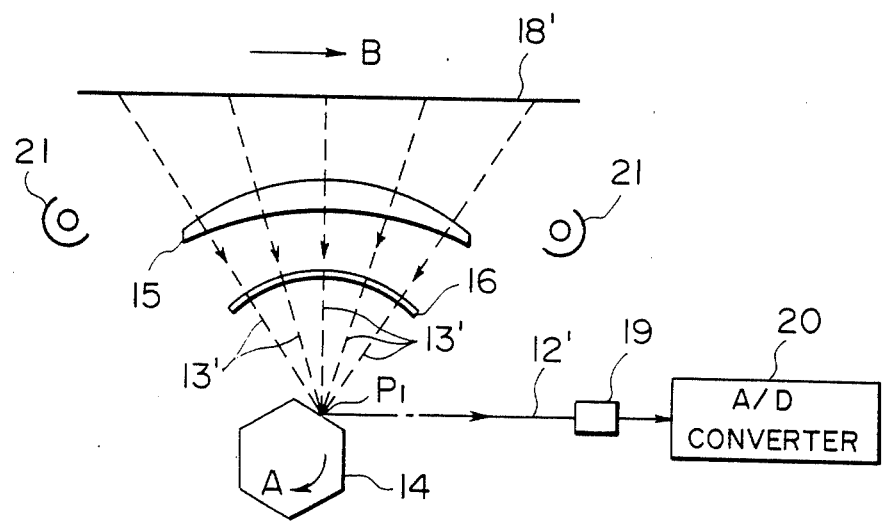
FIG. 5 illustrates still another embodiment of the present invention.
Figure 6:
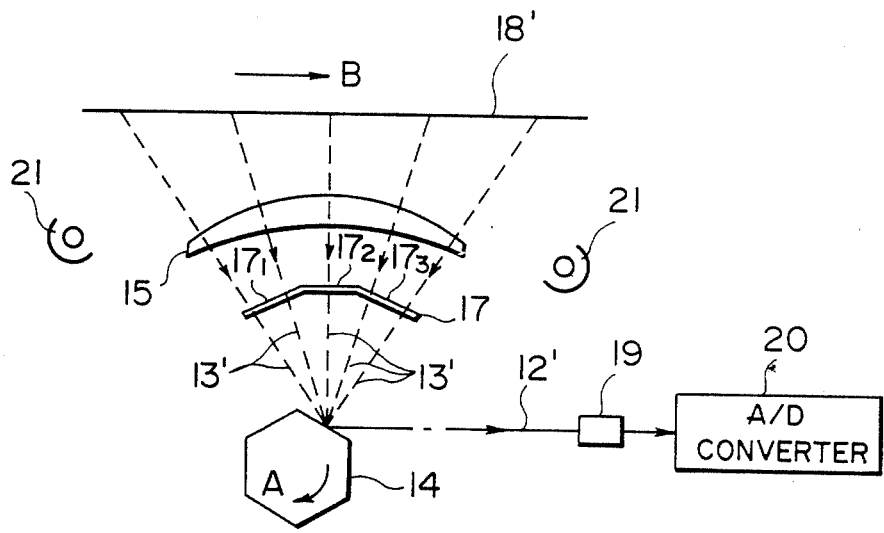
FIG. 6 illustrates yet still another embodiment of the present invention.

FIGS. 5 and 6 show a reading apparatus in which the semiconductor laser 11 is replaced by a photosensor 19 and the light beam 13' from the surface 18' to be scanned of an original to be read illuminated by a light source 21 such as a halogen lamp is directed to the photosensor 19 through a polygonal mirror 14. That is, this is a flying image type scanning optical system in which the image of the sensor 19 on the surface 18' to be scanned formed by a lens 15 is moved in the direction of arrow B by rotation of the polygonal mirror 14 to scan the surface 18'. In any case, the light beam 12' from the surface 18' to be scanned passing via the polygonal mirror 14 is photoelectrically converted and the resultant signal corresponding to the information to be read of the surface 18' to be scanned by an AD converter 20. In FIGS. 5 and 6, if it is necessary to provide a filter between the surface 18' to be scanned and the polygonal mirror 14, it is desirable to provide a filter 16 or 17 of the above-described construction.

The term "filter" used herein refers to an ND filter, a color filter or the like which absorbs part of the light when the light passes therethrough, thereby decreasing the quantity of emergent light as compared with the quantity of incident light.

The movable deflector for moving the light beam laterally is not restricted to a rotatable polygonal mirror or a galvano mirror but may also be a rotatable hologram.

What we claim is:

1. A scanning optical system in a laser beam printer comprising:

modulated beam forming means for forming a laser beam modulated correspondingly to an electrical signal to be recorded;

rotatable deflecting means for deflecting said laser beam to scan a photosensitive surface;

filter means disposed in the optical path between said rotatable deflecting means and said photosensitive surface and scanned by said laser beam, said filter means having a substantially concave surface facing said rotatable deflecting means; and a lens for imaging said laser beam on said photosensitive surface, said lens being disposed in the optical path between said photosensitive surface and said rotatable deflecting means, the laser beam passing through said filter means and said lens scanning said photosensitive surface in a predetermined direction.

2. A scanning optical system according to claim 1, wherein said filter means is disposed in the optical path between said rotatable deflecting means and said lens.

3. A scanning optical system according to either claim 1 or claim 2, wherein said substantially concave surface is a curved surface.

4. A scanning optical system according to claim 3, wherein the degree of curvature of the concave surface of said filter means is set such that said laser beam enters said filter means at an angle of incidence of 8° or less anywhere in the range over which said laser beam scans said filter means.

5. A scanning optical system according to either claim 1 or claim 2, wherein said substantially concave surface has a plurality of planar portions disposed so as to form a concave surface as a whole.

6. A scanning optical system according to claim 5, wherein the degree of curvature of the concave surface of said filter means is set such that said laser beam enters said filter means at an angle of incidence of 8° or less anywhere in the range over which said laser beam scans said filter means.

7. A scanning optical system according to either claim 1 or claim 2, wherein the light transmission factor of said filter means is lower in the central portion thereof than in the opposite end portions thereof.

8. A scanning optical system according to either claim 1 or claim 2, wherein said filter means has a substantially uniform light transmission factor over the full length of the laser beam scanning area.

9. A scanning optical system according to claim 8, wherein said filter means has the same thickness over the full length of the laser beam scanning area.

* * * * *

UNITED STATES PATENT AND TRADEMARK OFFICE
CERTIFICATE OF CORRECTION

PATENT NO. : 4,687,283

DATED : August 18, 1987

INVENTOR(S) : MICHIO ITO, ET AL.

It is certified that error appears in the above-identified patent and that said Letters Patent is hereby corrected as shown below:

COLUMN 1

Line 59, "thought" should read --through--.

COLUMN 2

Line 25, "is even number of times" should read
--is an even number of times--.
Line 27, "lingt," should read --light,--.
Line 29, "odd number of times" should read
--an odd number of times--.

COLUMN 3

Line 62, "$\alpha \doteq 20°$," should read -- $\alpha \simeq 20°$--.

COLUMN 4

Line 37, "dimension" should read --dimensions.
Line 64, change "of" to --from--.
Line 64, after "scanned" insert --is converted--.

Signed and Sealed this

Second Day of February, 1988

Attest:

DONALD J. QUIGG

Attesting Officer     Commissioner of Patents and Trademarks